US007023411B2

(12) United States Patent
Fujii

(10) Patent No.: US 7,023,411 B2
(45) Date of Patent: Apr. 4, 2006

(54) ELECTRONIC PRICE SCALE WITH CONTRAST ADJUSTMENT FUNCTION, DRIVE CONTROL SYSTEM FOR LIQUID CRYSTAL DISPLAY DEVICE AND DRIVE CONTROL METHOD THEREOF

(75) Inventor: Noriyasu Fujii, Numazu (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 454 days.

(21) Appl. No.: 10/170,517

(22) Filed: Jun. 13, 2002

(65) Prior Publication Data

US 2002/0191007 A1 Dec. 19, 2002

(30) Foreign Application Priority Data

Jun. 18, 2001 (JP) ............................ 2001-183508

(51) Int. Cl.
*G09G 3/36* (2006.01)

(52) U.S. Cl. ........................................ 345/88; 345/690

(58) Field of Classification Search ............ 345/87–92, 345/173, 174, 589, 617, 22, 50, 51, 63, 690; 348/234–236
See application file for complete search history.

(56) References Cited

U.S. PATENT DOCUMENTS

| | | | | |
|---|---|---|---|---|
| 5,402,151 | A * | 3/1995 | Duwaer | 345/173 |
| 5,416,890 | A | 5/1995 | Beretta | |
| 6,300,931 | B1 * | 10/2001 | Someya et al. | 345/102 |
| 6,414,664 | B1 * | 7/2002 | Conover et al. | 345/102 |
| 6,535,225 | B1 * | 3/2003 | Shintaku et al. | 345/690 |

FOREIGN PATENT DOCUMENTS

| | | | |
|---|---|---|---|
| JP | 4-316087 | A | 11/1992 |
| JP | 05-079891 | * | 3/1993 |
| JP | 2000-147455 | A | 5/2000 |
| JP | 2001-147673 | A | 5/2001 |

* cited by examiner

*Primary Examiner*—Chanh Nguyen
(74) *Attorney, Agent, or Firm*—Frishauf, Holtz, Goodman & Chick, P.C.

(57) ABSTRACT

An electronic price scale having a TFT type of LCD as a display comprises a contrast adjustment function which adjusts a contrast of the LCD.

6 Claims, 7 Drawing Sheets

ELECTRONIC PRICE SCALE WITH CONTRAST ADJUSTMENT FUNCTION, DRIVE CONTROL SYSTEM FOR LIQUID CRYSTAL DISPLAY DEVICE AND DRIVE CONTROL METHOD THEREOF

CROSS-REFERENCE TO RELATED APPLICATIONS

This application is based upon and claims the benefit of priority from the prior Japanese Patent Application No. 2001-183508, filed Jun. 18, 2001, the entire contents of which are incorporated herein by reference.

BACKGROUND OF THE INVENTION

1. Field of the Invention

The present invention relates to an electronic price scale used in supermarkets, department stores, or specialty stores, etc.

2. Description of the Related Art

An electronic price scale is widely used, for example, in supermarkets etc. A LCD (Liquid Crystal Display device) is used for a display device of such electronic price scale. In general, a STN (Super Twisted Nematic) type of LCD, which is relatively inexpensive, is used.

A display of the LCD is seen differently depending on angles of view. Here, the angle of view is an angle formed by a vertical line from the LCD surface and a line of sight. For example, when the line of sight is on the vertical line, the angle of view is 0 degree. Therefore, for the STN type of LCD, when the angle of view is changed, the contrast thereof is changed accordingly so as to suppress a change in that how the display is seen.

A TFT type of LCD is substantially used for note-type personal computers etc. In such a computer, the LCD is configured to change its own angle. But, the LCD used for an electronic price scale is configured in such a manner that its own angle is fixed. The angle of view differs depending on the case that the LCD is looked up from below and the case that the LCD is looked down from above, thereby a difference in the contrast occurs. Therefore, there is a problem that the shop assistant cannot easily see the screen of the LCD.

BRIEF SUMMARY OF THE INVENTION

An object of the invention is to provide an electronic price scale using the TFT for a display therein and having a contrast function which comprises a contrast adjustment function and enables suppression of difference in contrast caused by an angle of view as much as possible, a drive control system for a liquid crystal display device, and a drive control method thereof.

An electronic price scale with a contrast adjustment function, according to claim 1, is characterized by comprising a display constituted by a TFT type of LCD; and a contrast adjustment unit configured to adjust a contrast by changing luminance gradation for each color of colors to be displayed on the display.

According to an embodiment of the invention, it is possible to adjust a contrast of the LCD by changing the luminance gradation for each color to be displayed in the display.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
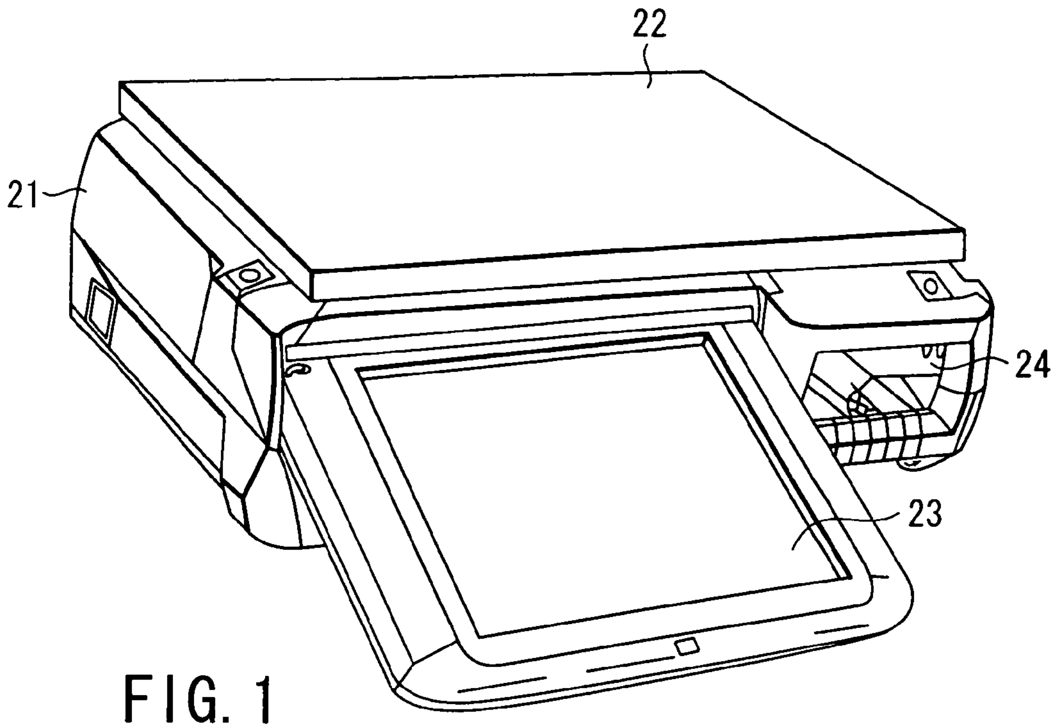
FIG. 1 is a perspective view of an electronic price scale with a contrast function according to an embodiment of the invention.

An electronic price scale with a contrast adjustment function according to an embodiment of the invention now will be described with reference to the accompanying drawings, hereinafter. FIG. 1 is a perspective view of the electronic price scale. In FIG. 1, the numeral 21 denotes a casing of the electronic price scale. On the upper surface of the electronic scale casing 21, a scale section 22 is disposed.

Further, in the front of the casing 21, a LCD (liquid crystal display device) 23 is mounted freely in swinging with its upper surface used as an axis.

At the right end of the casing 21, there is disposed an outlet 24 from where a label printed with a built-in thermal head.

Figure 2:
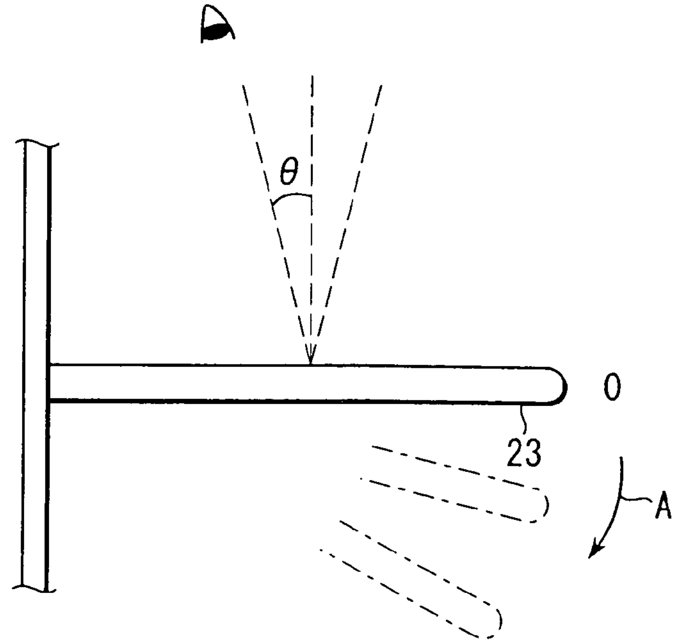
FIG. 2 is a diagram for explaining an angle of view of a LCD according to the embodiment.

As shown in FIG. 2, the LCD 23 is mounted freely in swinging from the same horizontal plane as the scale section 22 toward the arrow A direction.

Figure 3:
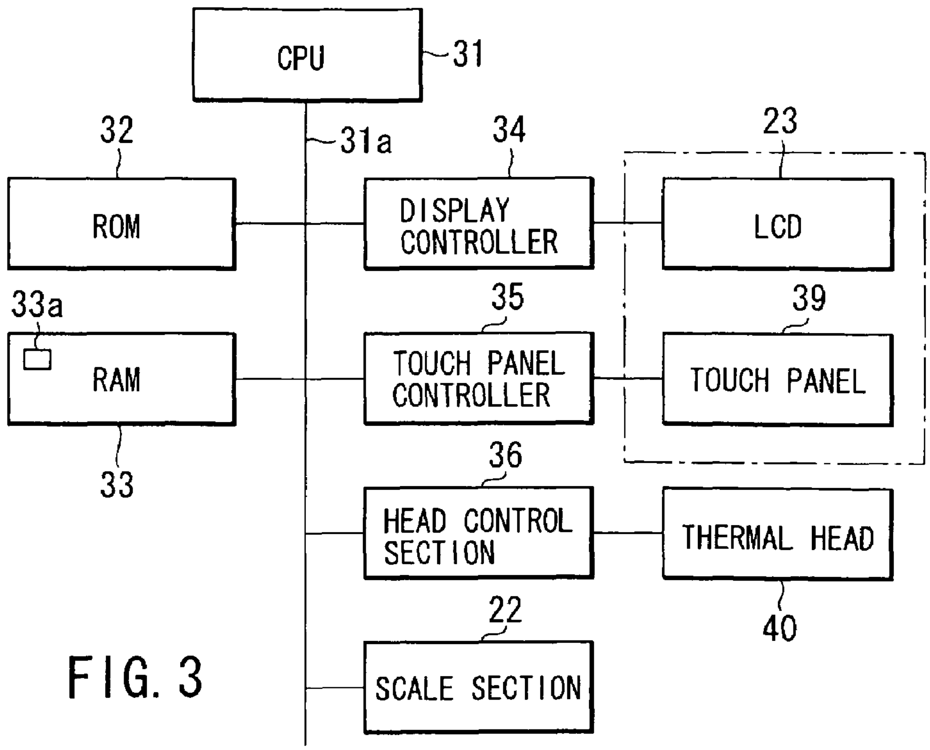
FIG. 3 is a block diagram showing a system configuration of the electronic price scale according the embodiment.

Next, with reference to FIG. 3, a block diagram showing a system configuration of the electronic price scale will be described. In FIG. 3, the numeral 31 denotes a CPU (Central Processing Unit). To a system bus 31$a$ from the CPU 31, there are connected a ROM (Read Only Memory) 32, a RAM (Random Access Memory) 33, a display controller 34, a touch panel controller 35, a head control section 36, and the scale section 22.

Figure 6A:
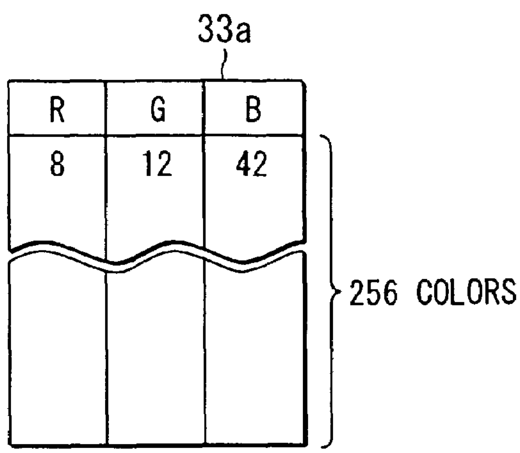
FIG. 6A is a diagram showing data stored in a color pallet.
Figure 6B:
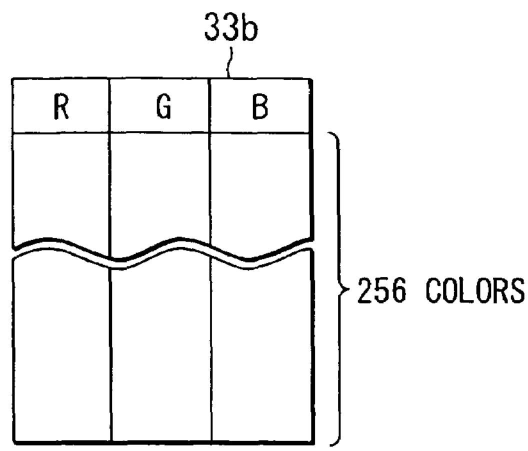
FIG. 6B is a diagram showing data stored in a corrected color pallet.

In the RAM 33, a commodity name, price, and tare, etc. comprise a PLU (Price Look Up) table for each commodity. Further, in the RAM 33, an area 33*a* that stores luminance gradation data representing how many gradations each color of RGB is displayed with, that is, a color pallet 33*a* is provided. The color pallet 33*a* is shown in FIG. 6A. A display color of the LCD 23 is represented by the combination of luminance gradations of the respective colors of RGB. Assuming that each color of RGB is displayed with the gradation of 0 to 63, colors of 64×64×64=262,144 can be displayed. The luminance gradation data of 256 colors is picked up out of this 260 thousands and stored in the color pallet 33*a*. When each color of RGB is displayed with gradations of 0 to 63, each color has gradation data of 6 bits.

The display controller 34 comprises a contrast adjustment function that controls gradations for the respective display colors to be displayed on the LCD 23 based on the luminance data for the respective color set in the color pallet 33*a* of the RAM 33.

That is, the LCD 23 is connected to the display controller 34, a touch panel 39 is connected to the touch panel controller 35, and a thermal head 40 is connected to the head control section 36.

Figure 4:
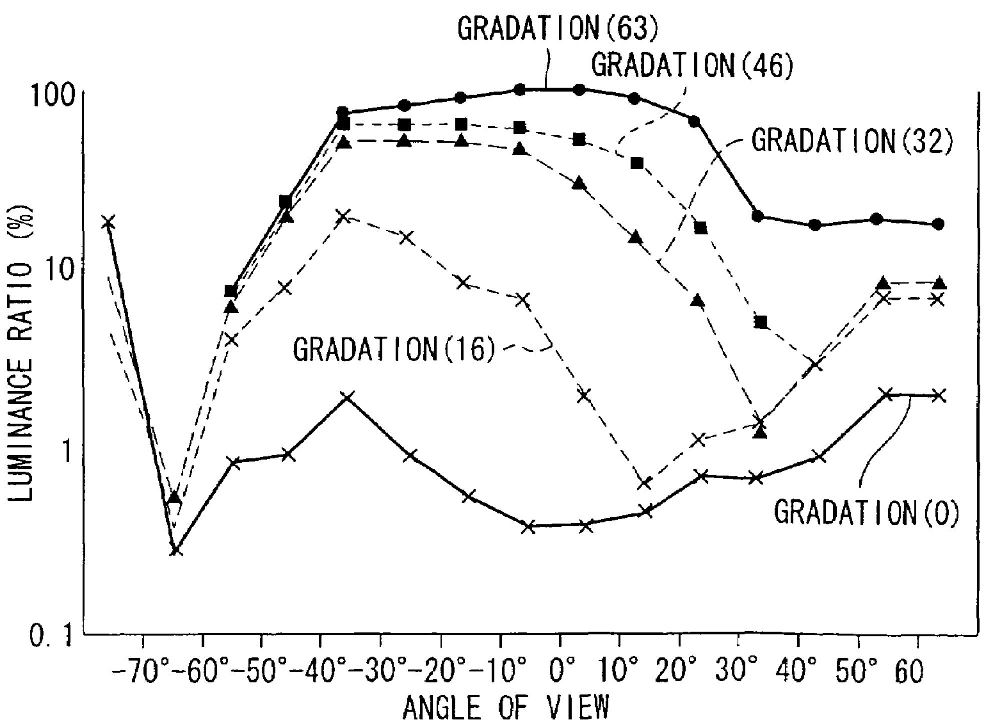
FIG. 4 is a characteristic diagram showing the relation between an angle of view and a luminance ratio according to the embodiment.

FIG. 4 is a characteristic diagram showing the relation between an angle of view (degree) to the LCD 23 and a luminance ratio (%). Here, the luminance ratio means {luminance for angle of view θ°/luminance for angle of view 0°}×100(%). The angle of view θ° means a angle formed by a vertical line from the LCD surface and a line of sight. The angle of view 0° shows the state where an operator looks at the LCD 23 from the vertical direction of the surface thereof.

FIG. 4 shows the change in luminance ratio for each case that the luminance gradations are 63-gradations, 46-gradations, 32-gradations, 16-gradations, and 0-gradations, respectively, from the top to down in the drawing when the angle of view is changed between −70° and 60°. It is obvious in FIG. 4 that, as the angle of view increases from 0°, the luminance ratio decreases. This phenomenon corresponds with the fact that the more diagonal angle the LCD 23 is looked from, the darker the screen is seen.

Additionally, for the case of a uniform angle of view, as the luminance gradation increases, the luminance ration increases.

Figure 5:
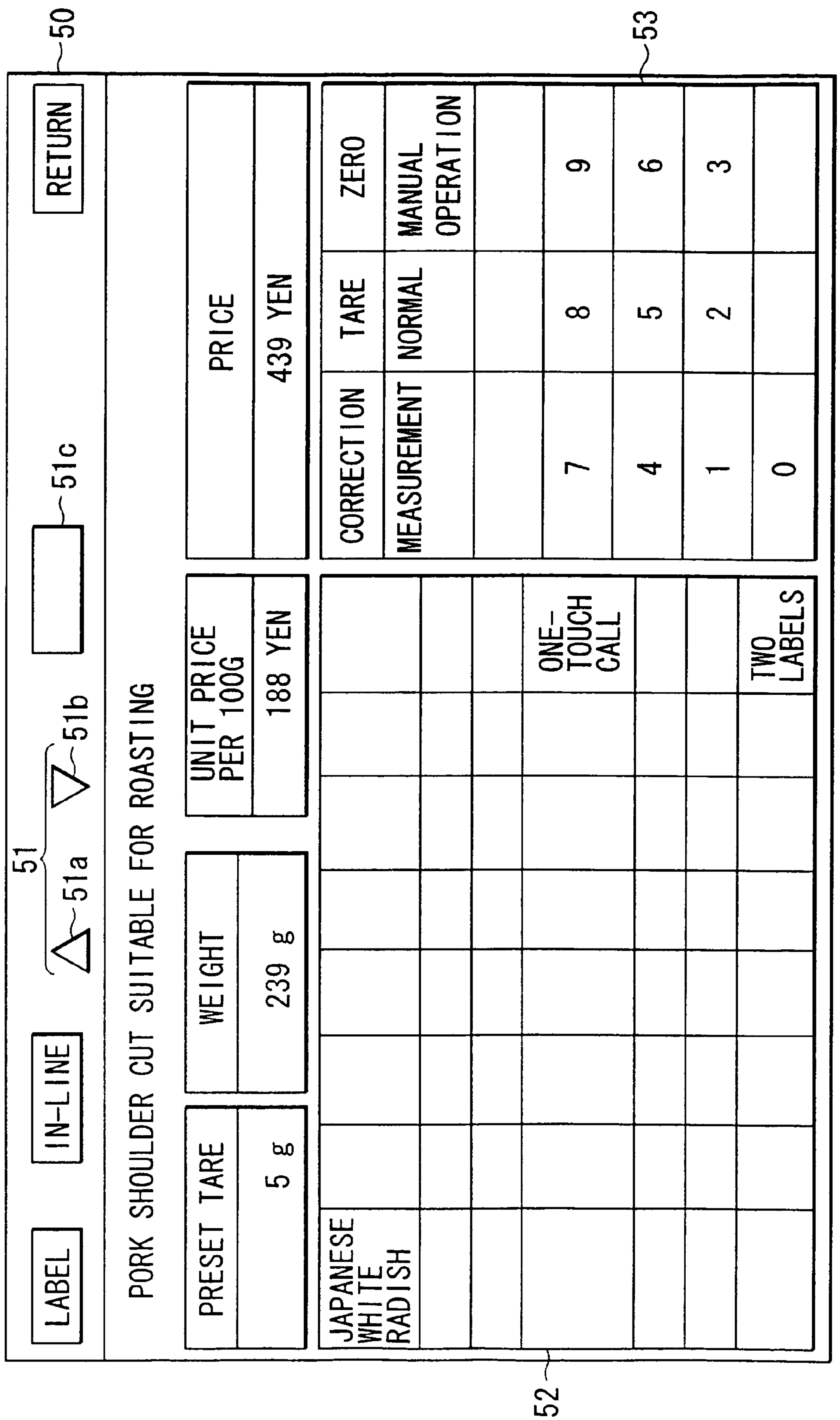
FIG. 5 is a diagram showing a display example on the LCD according to the embodiment.

When the operator turns on the power supply of the electronic price scale, a registration screen as shown in FIG. 5 is displayed on the LCD 23. As shown in FIG. 5, on a menu bar 50 in the registration screen, there are displayed a luminance up key 51*a* that is operated for increasing the luminance and a luminance down key 51*b* that is operated for decreasing the luminance. The luminance up key 51*a* and luminance down key 51*b* constitute a contrast adjustment key 51. In this case, both the luminance up key 51*a* and luminance down key 51*b* can be operated at 16 levels.

That is, whenever the luminance up key 51*a* or luminance down key 51*b* is operated, the operation signal is output to the display controller 34.

Further, below the menu bar 51, there is displayed the state that "Pork shoulder cut suitable for roasting" is set as a commodity name; "5 grams", the preset tare; "239 grams", the weight; "188 yen", the unit price per 100 grams; and "439 yen", the price, respectively.

The numeral 52 denotes one-touch call keys arranged in a matrix. In addition, there are provided a "Correction" key, a "Tare" key, a "Measure" key, a "Normal" key, a "Manual operation" key. In addition to those, a ten key 53 is also provided.

Figure 7:
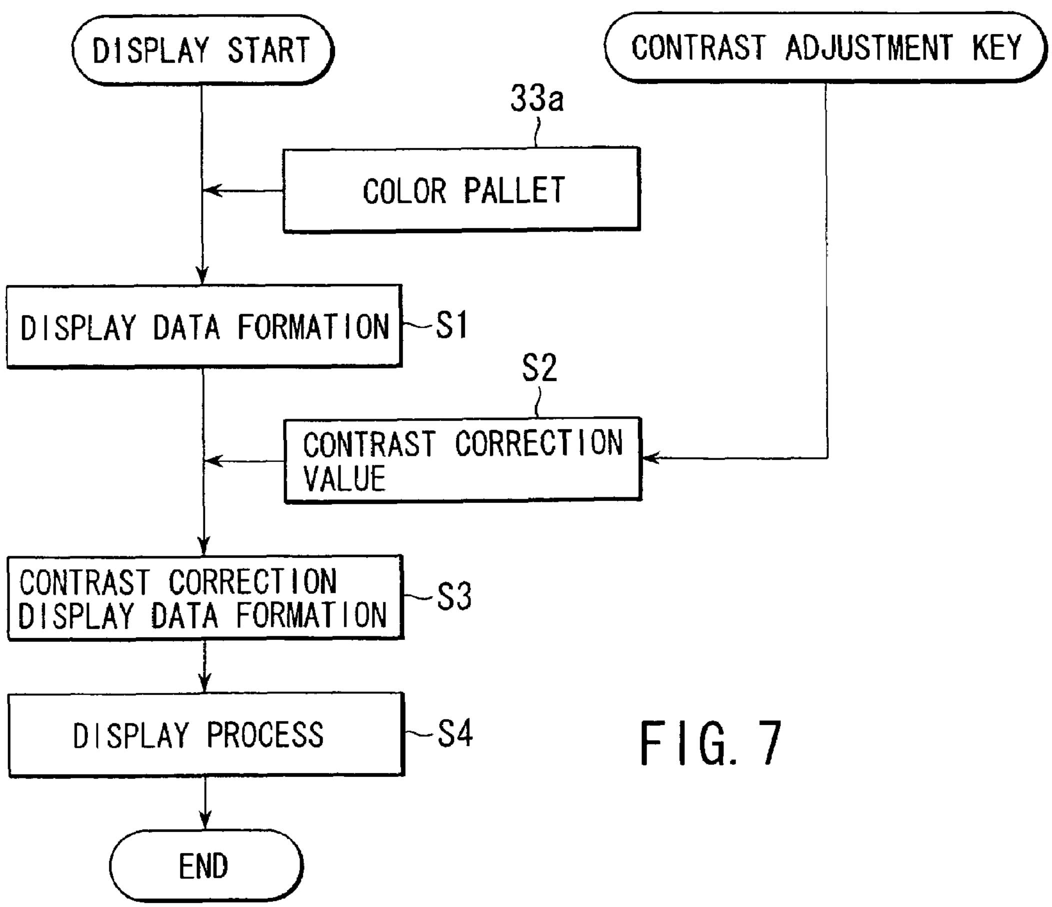
FIG. 7 is a chart for explaining a contrast adjusting function according to a first embodiment of the invention.

Next, a contrast adjustment function included in the display controller 34 will be described. FIG. 7 is a chart showing a first embodiment of the contrast adjustment function. Bit map data for displaying is stored in the RAM 33, a signal for starting display control is output to the display controller 34, and then a process in the chart shown in FIG. 7 is stated. That is, it is determined which of display colors in the color pallet 33*a* to be used for each dot of the bit map data, and then RGB luminance gradations stored in the color pallet 33*a* are formed as display data by a display data forming section (Step S1).

If the contrast adjustment key 51 is operated, a contrast correction value is output (Step S2). That is, when the luminance up key 51*a* is operated once, a contrast correction value output section S2 outputs a value of +1 as a contrast correction value; and being operated twice, the section outputs a value of +2. The luminance up key 51*a* can be operated up to 16 times. In this case, the contrast correction value output section S2 outputs a value of +16 as the contrast correction value.

On the other hand, when the luminance down key 51*b* is operated once, the contrast correction value output section S2 outputs a value of −1 as the contrast correction value; and being operated twice, the section outputs a value of −2. The luminance down key 51*b* can be operated up to 16 times. In this case, the contrast correction value output section S2 outputs a value of −16 as the contrast correction value.

Subsequently, the display data formed by the display data forming section S1 is corrected in a contrast correction data forming section in accordance with the contrast correction value output from the contrast correction value output section S2 (Step S3). Then, based on the corrected display data formed in the contrast correction data forming section, a process of displaying on the LCD 23 is performed in a display drive section (Step S4).

For example, a case will be described in that "8, 12, 42" of RGB gradation data as shown in FIG. 6A are formed for one dot of the display data. In this case, when the luminance up key 51*a* is operated only once, the gradation data of R are increased by one level in 16 levels that the gradations of R between 8 and 63 are divided into. On the other hand, when the luminance down key 51*b* is operated only once, the gradation data of R are decreased by one level in 16 levels that the gradations of R between 0 and 8 are divided into.

Hereinafter, the similar processes are performed to the gradation data of G and the gradation data of B.

For example, as the angle of view θ increases, the luminance ratio decreases. In this case, the luminance up key 51*a* is operated once. Then, a process is performed in that each luminance gradation data of RGB selected as the display color for a dot are increased by one level. As described above, it is designed that each luminance gradation data of RGB selected as the display color for the dot are increased at the uniform ratio with one another by operating the luminance up key 51*a*. As a result, the contrast can be adjusted by increasing the luminance without changing a tone of color for the display dot.

On the other hand, when the luminance down key 51*b* is operated, an operation is performed reversely to the case that the luminance up key 51*a* is operated. In this case, each gradation data of RGB selected as a display color for the dot is decreased at the uniform rate. Thus, the contrast can be adjusted by decreasing the luminance without changing the tone of color for the display dot.

Figure 11A:
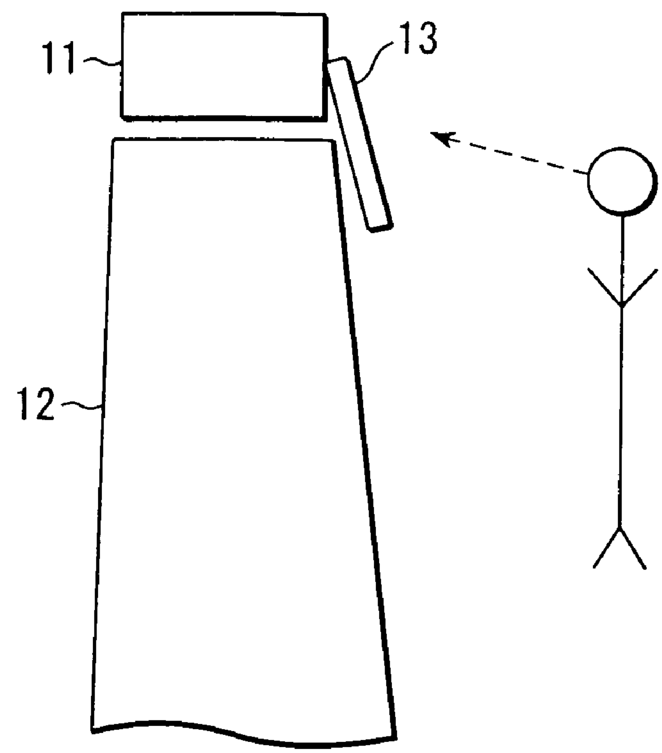
FIGS. 11A and 11B are diagrams for explaining effects of the embodiment of the invention.
Figure 11B:
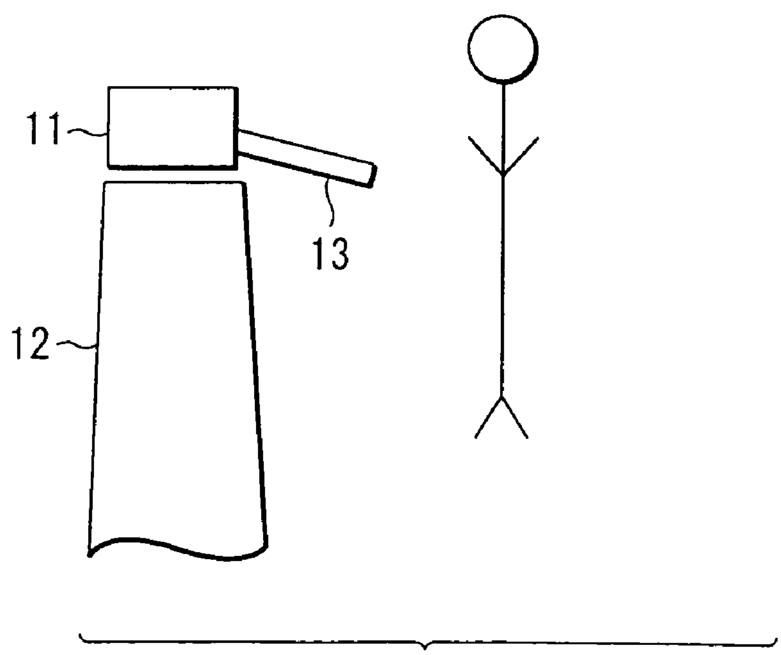

For example, as shown in FIGS. 11A or 11B, even in the case that the angle of view between the shop assistant and the LCD 23 is changed by pivoting the LCD 23, the gradation of each color to be displayed on the LCD 23 is changed so as to adjust the contrast, and thus the tone of color to be displayed can be seen similarly to the state prior to the change of the angle.

Next, a contrast adjustment function according to a second embodiment of the invention will be described with reference to a chart shown in FIG. 8. In the second embodiment, a contrast correction value, which is output from the contrast correction value output section S2 by operating the contrast adjustment key 51, is the same as one in FIG. 7. In accordance with the contrast correction value output from the contrast correction value output section S2, RGB gradation data of 256 colors, which are stored in the color pallet 33*a* are corrected, and then a contrast correction color pallet 33*b* is formed.

For example, a case will be described such that the RGB gradation data of "8, 12, 42" are stored as the color pallet as shown in FIG. 6A. In this case, when the luminance up key 51*a* is operated only once, the gradation data of R are increased by one level in 16 levels that the gradations of R between 8 and 63 are divided into. On the other hand, when the luminance down key 51*b* is operated only once, the gradation data of R are decreased by one level in 16 levels that the gradations of R between 0 and 8 are divided into. The corrected gradation data are stored in the contrast correction color pallet 33*b*.

Hereinafter, the similar processes are performed to the G gradation data and the B gradation data. Whenever the contrast adjustment key 51 is operated, the content of the color pallet 33*a* is stored in the corrected contrast correction color pallet 33*b*.

Figure 8:
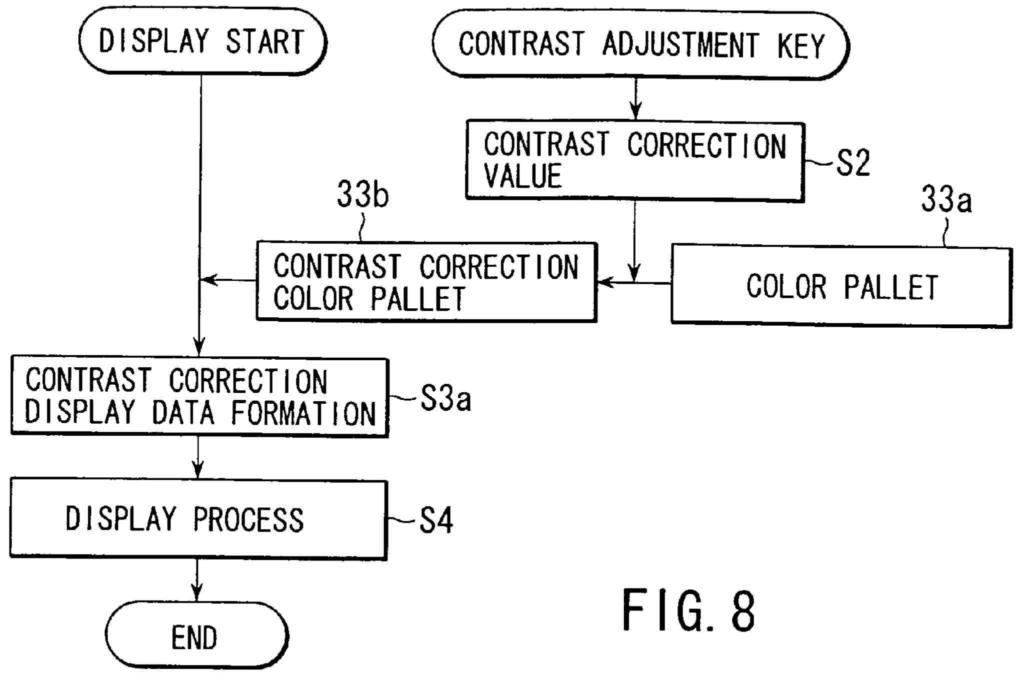
FIG. 8 is a chart for explaining a contrast adjusting function according to a second embodiment of the invention.

When bit map data for displaying is stored in the RAM 33 and a signal of starting display control is output to the display controller 34, a process in the chart shown in FIG. 8 is started. That is, it is determined which of display colors in the contrast correction color pallet 33*b* to be used for each dot of the bit map data, and then RGB luminance gradation data stored in the contrast correction color pallet 33*b* are formed as display data by a contrast correction display data forming section (Step S3*a*).

Subsequently, based on the display data corrected in the contrast correction data forming section (Step S3*a*), a process of displaying on the LCD 23 is performed in the display drive section (Step S4).

As described above, according to the second embodiment, the color pallet 33*a* is corrected in accordance with the operation of the contrast adjustment key 51 so as to form the contrast correction color pallet 33*b*. That is, when the luminance up key 51*a* is operated, the respective RGB luminance gradation data in the color pallet 33*a* are increased at the uniform ratio; and when the luminance down key 51*b* is operated, the respective RGB luminance gradation data in the color pallet 33*a* are decreased at the uniform ratio, and then both the increased and decreased data are stored in the contrast correction color pallet 33*b*.

The contrast correction data forming section S3*a* obtains the RGB luminance gradation data of the display data for each dot of the display color with reference to the contrast correction color pallet 33*b*. Therefore, even in the case that the angle of view between the shop assistant and the LCD 23 is changed by pivoting the LCD 23, the luminance gradation of each color to be displayed on the LCD 23 is changed so as to adjust the contrast, and thus the tone of color to be displayed can be seen similarly to the state prior to the change of the angle.

Figure 9:
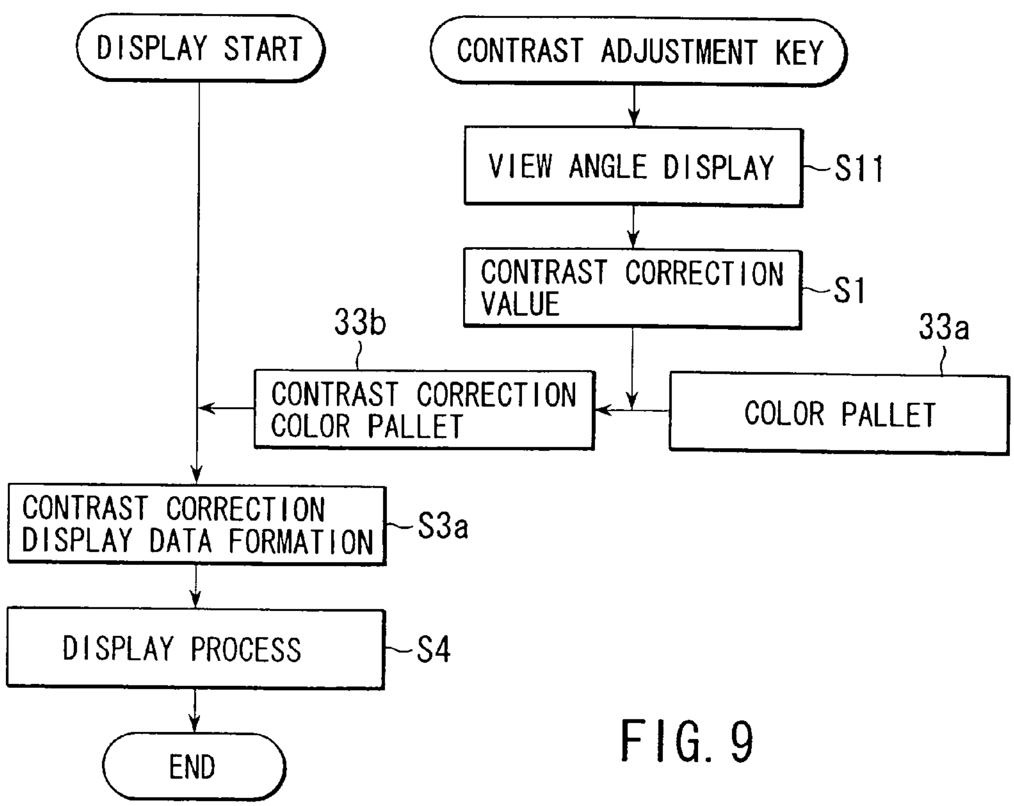
FIG. 9 is a chart for explaining a contrast adjusting function according to a third embodiment of the invention.
Figure 10:
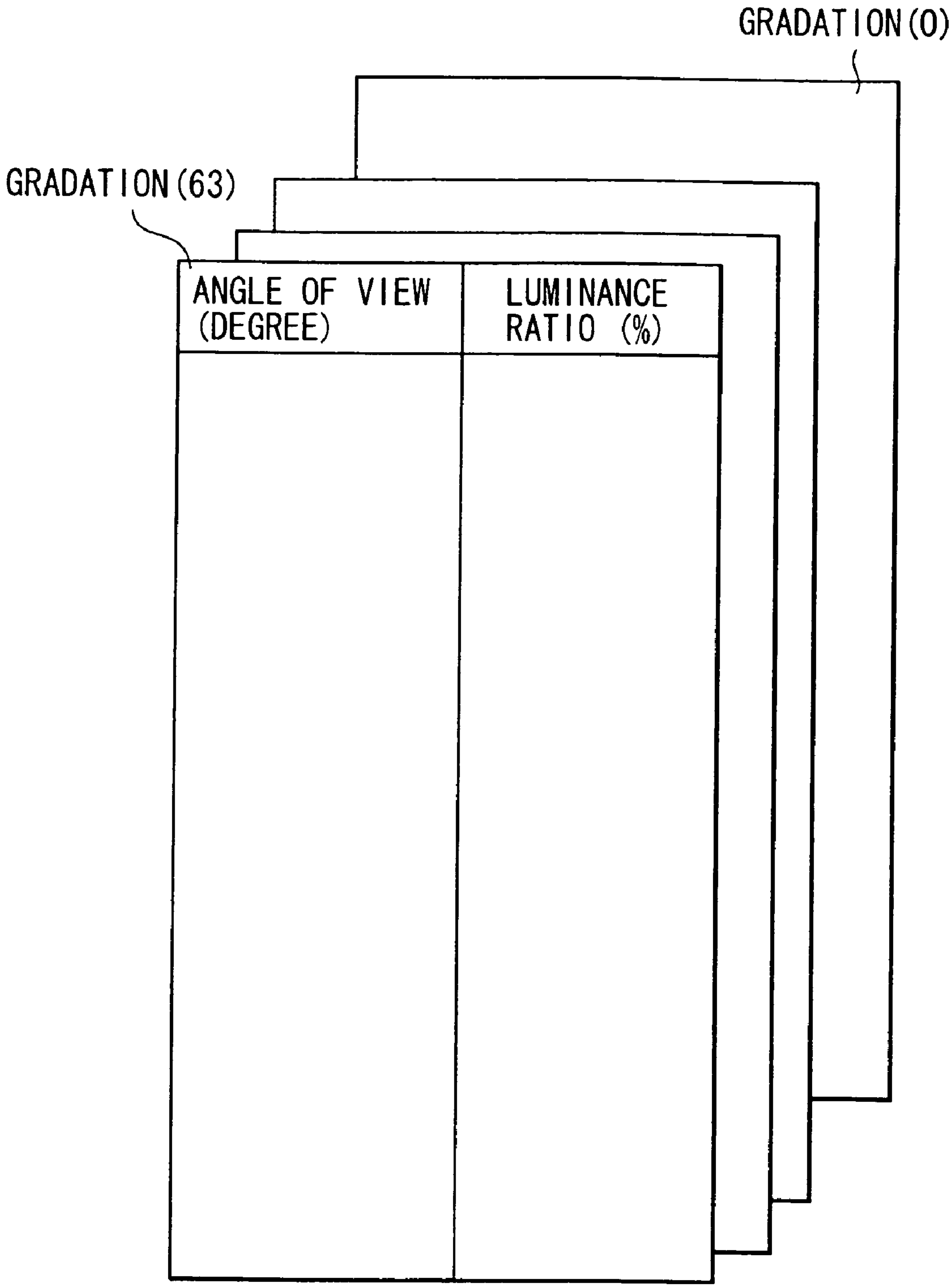
FIG. 10 is a diagram showing a data table to store a luminance ratio to an angle of view of the LCD for each gradation.

Next, a third embodiment of the invention will be described with reference to a chart shown in FIG. 9. According to the third embodiment, whenever the contrast adjustment key 51 is operated, indication of view angle is added to FIG. 8 (Step S11). Whenever the contrast adjustment key 51 is operated, the angle of view is indicated in a view angle indication section 51*c*. As shown in FIG. 10, in the RAM 33, there is stored a table which stores the luminance ratio to the angle of view for each luminance gradation. That is, the data shown in FIG. 4 are stored as the table, and a contrast correction value corresponding to the angle of view indicated in Step S11 is output from the contrast correction value output section S1.

Hereinafter, the process similar to the one in the second embodiment is performed. Further, the angle of view can be indicated in addition to the effect according to the second embodiment.

Incidentally, according to the embodiments described above, with the operation of the luminance up key 51*a* or luminance down key 51*b*, the RGB luminance gradation data are increased or decreased at the uniform ratio and are set in the region 33*a*. However, it may simply be +1 or −1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic price scale comprising:

a display comprising a TFT type LCD as a display surface;

an input section for adjusting a contrast of the LCD; and a contrast adjustment unit configured to adjust the contrast of the LCD by changing a luminance gradation for each color of colors displayable on the display;

wherein the contrast adjustment unit comprises:

a color pallet configured to store luminance gradation data of three primary colors of the colors displayable on the display;

a display data forming section configured to read luminance gradation data corresponding to colors to be displayed on the display from the color pallet so as to form display data;

a contrast correction value forming section configured to form a contrast correction value in accordance with input data input from the input section;

a contrast correction display data forming section which corrects the display data Output from the display data forming section with the contrast correction value output from the contrast correction value forming section so as to form corrected display data; and a display drive section configured to drive the display based on the corrected display data output from the contrast correction display data forming section.

2. A drive control system for a liquid crystal display device comprising a liquid crystal display device;

an input section for adjusting a contrast of the liquid crystal display device; and a display control unit configured to chance a luminance gradation of each color of colors displayable on the liquid crystal display device in accordance with input data from the input section so as to adjust the contrast of the liquid crystal display device;

wherein the display control unit comprises:

a color pallet configured to store luminance gradation data of three primary colors of the colors displayable on the liquid crystal display device;

a display data forming section configured to read luminance gradation data corresponding to colors to be displayed on the liquid crystal display device from the color pallet so as to form display data;

a contrast correction value forming section configured to form a contrast correction value in accordance with the input data input from the input section;

a contrast correction display data forming section which corrects the display data output from the display data forming section with the contrast correction value output from the contrast correction value forming section so as to form corrected display data; and a display drive section configured to drive the liquid crystal display device based on the corrected display data output from the contrast correction display data forming section.

3. The system according to claim 2, wherein the contrast correction value forming section one of increases or and decreases the luminance gradation data stored in the color pallet in the input data from the input section.

4. A drive control system for a liquid crystal display, comprising a liquid crystal display device;

an input section for adjusting a contrast of the liquid crystal display device; and a display control unit configured to chancre a luminance gradation of each color of colors displayable on the liquid crystal display device in accordance with input data from the input section so as to adjust the contrast of the liquid crystal display device;

wherein the display control unit comprises:

a color pallet configured to store luminance gradation data of three primary colors of the colors displayable on the liquid crystal display device;

a contrast correction value forming section configured to form a contrast correction value in accordance with the input data input from the input section;

a correction color pallet forming section which corrects the luminance gradation data stored in the color pallet with the contrast correction value output from the contrast correction value forming section so as to form a corrected color pallet;

a contrast correction display data forming section configured to read luminance gradation data corresponding to colors to be displayed on the liquid crystal display device from the correction color pallet so as to form display data; and a display drive section configured to drive the liquid crystal display device based on the display data output from the contrast correction display data forming section.

5. The system according to claim 4, wherein the contrast correction value forming section one of increases and decreases the luminance gradation data stored in the color pallet in the input data from the input section.

6. The system according to claim 4, wherein the contrast correction value forming section is configured to indicate an angle of view whenever the input section is operated, and to determine the contrast correction value such that the luminance gradation data for the colors is corrected without changing a luminance ratio even if the angle of view is changed.

* * * * *